United States Patent [19]

Blind et al.

[11] 4,163,717

[45] Aug. 7, 1979

[54] REMOVAL OF SILICA FROM MIXED BED DEMINERALIZER

[75] Inventors: Roger A. Blind, Morristown, N.J.; Robert T. Saterbak, Baytown, Tex.; Edward I. Wolfe, Whippany, N.J.

[73] Assignee: Exxon Research & Engineering Co., Florham Park, N.J.

[21] Appl. No.: 860,690

[22] Filed: Dec. 15, 1977

[51] Int. Cl.$^2$ .............................................. C02B 1/70
[52] U.S. Cl. .................................... 210/31 R; 210/32; 210/35; 210/37 R
[58] Field of Search ................. 210/30 R, 31 R, 37 R, 210/32, 35, 34

[56] References Cited

U.S. PATENT DOCUMENTS

| | | | |
|---|---|---|---|
| 2,561,834 | 7/1951 | Wunsch | 210/30 R |
| 2,692,244 | 10/1954 | Kunin et al. | 210/31 R |
| 2,732,342 | 1/1956 | Frey | 210/37 R |
| 2,962,438 | 11/1960 | Smith | 210/37 R |

FOREIGN PATENT DOCUMENTS 711188   6/1954   United Kingdom ................. 210/30 R

*Primary Examiner*—Benoit Castel
*Attorney, Agent, or Firm*—John W. Ditsler

[57] ABSTRACT

Silica can be removed effectively from a mixed bed demineralizer containing an anion exchange resin and a cation exchange resin during regeneration by
(1) passing from about 30 to about 80 volume % of an anion regenerant solution through only the anion exchange resin,
(2) passing the remaining portion of the anion regenerant solution through both the anion exchange resin and the cation exchange resin, and
(3) passing a stream of cation regenerant solution through the cation exchange resin.

When the anion and cation exchange resins are regenerated according to this procedure, the amount of silica on the resins is reduced such that when silica containing water is passed through the demineralizer during normal operations, the concentration of silica in the treated water as $SiO_2$ will be less than 0.1, most preferably less than 0.005, milligrams per liter.

12 Claims, 2 Drawing Figures

REMOVAL OF SILICA FROM MIXED BED DEMINERALIZER

BACKGROUND OF THE INVENTION

1. Field of the Invention

This invention relates generally to the regeneration of ion exchange resins. More particularly, this invention involves the regeneration of anion and cation exchange resins which have been used for the removal of silica and various mineral salts from water.

2. Description of the Prior Art

Silica is present in virtually all natural waters, typically in amounts ranging from about 1 to 200 milligrams per liter or more. While silica is essential to the functioning of many biological organisms, including man, its present in water is known to create difficulties in many industrial operations. For example, in the steam generation facilities associated with most power generating plants, silica enters the boiler with the feed water and becomes concentrated therein due to the generation of steam. More importantly, however, silica also will be volatilized such that it is present in the steam in volatile form. Eventually the concentration of silica becomes sufficient to cause deposition of a hard scale in the boiler and/or in downstream equipment (particularly turbine blades) such that the boiler must periodically be purged of the silica concentrated water and replaced with fresh feed water. Such periodic purging and replacement operations are generally known in the industry as "blow-down." Since the frequency of blow-down as well as the quantity of water required to purge the boiler is dependent upon the amount of silica in the feed water, it is desirable to have as low concentration of silica in the boiler feed water as is possible. In this way, both water and energy usages can be minimized.

One method for removing silica as well as various mineral salts from water is by direct contact with a substantially homogeneous mixture (i.e., an intimate mixture) of anion and cation exchange resins in a mixed bed demineralizer wherein the anions and cations forming the salts are exchanged. This direct exchange continues until the exchange capacity of the resins is considered to be exhausted. Normally, this occurs when the resins become saturated with ions absorbed from the water. It is then necessary to restore the exchange capacity by regeneration.

In typical ion exchange processes, the substantially homogeneous mixture of anion and cation exchange resins is separated into two discrete layers prior to regeneration. This is usually accomplished by passing water upward through the demineralizer (often termed "backwashing") such that the admixture of anion and cation exchange resins stratifies into two discrete layers due to the different densities of the anion and cation exchange resins. Usually the anion exchange resin occupies the upper layer while the heavier cation exchange resin collects in the lower layer.

After the so-called "hydraulic grading" of the mixed bed as described above, regeneration of the exchange resins is normally effected by first passing an anion regenerant solution through the anion exchange resin and then a cation regenerant solution through the cation exchange resin (see Applebaum, Samuel B., "Demineralization by Ion Exchange", Academic Press, New York, 1968 and Arden, T.V., "Water Purification by Ion Exchange," Plenum Press, New York, 1968, the disclosures both of which are incorporated herein by reference). It has also been suggested to wash both the anion and the cation exchange resin with the anion regenerant solution prior to regenerating the cation exchange resin (see U.S. Pat. Nos. 2,666,741 and 2,736,698).

However, these methods of regenerating the anion and cation exchange resins are not effective in reducing the concentration of silica in the treated water to ultralow levels; i.e., concentrations of less than 0.01 milligrams per liter as $SiO_2$. Thus, in view of the advantages of minimizing the amount of silica in water employed in industrial applications, it would be desirable to have available a simple and convenient method for reducing the concentration of silica to levels below those presently obtainable.

SUMMARY OF THE INVENTION

Now according to the present invention, it has been discovered that when the anion and cation exchange resins of a mixed bed demineralizer are regenerated according to the technique described hereinbelow, substantially complete removal of silica from water can be obtained. This result is premised on our discovery that silica is removed by the cation exchange resin as well as by the anion exchange resin. As such, conventional mixed bed ion exchange regeneration processes wherein the anion regenerant solution is passed through only the anion exchange resin are unsatisfactory for achieving ultralow levels of silica in treated water since the silica on the cation exchange resin is not removed therefrom. Similarly, initially passing the anion regenerant solution through both the anion and cation exchange resins is believed to merely wash the silica from the anion exchange onto the cation exchange resin.

Thus, in order to obtain ultralow levels of silica in water, it has been found necessary to modify the prior art procedures that have been suggested for regenerating mixed bed ion exchange resins and pass initially only from about 30 to about 80 volume % of the anion regenerant solution through the anion exchange resin. This effects a partial regeneration of the anion exchange resin by removing the silica and other mineral salts therefrom while avoiding contamination of the cation exchange resin. The remaining portion of the anion regenerant solution is then passed through both the anion and cation exchange resins. Since the silica present on the anion exchange resin was removed therefrom during the initial washing of same, the subsequent treating of both the anion and cation exchange resins serves to complete the regeneration of the anion exchange resin as well as to remove the silica from the cation exchange resin without contaminating said resin with silica from the anion exchange resin. The cation exchange resin may then be regenerated by contact with a cation regenerant solution.

When a mixed bed demineralizer containing anion and cation exchange resins which have been regenerated in the manner described above is returned to normal service and water containing silica is passed therethrough, there will result the substantially complete removal of the silica from said water; i.e., the concentration of silica in the treated water will be less than 0.1 milligrams per liter as $SiO_2$.

DETAILED DESCRIPTION OF THE INVENTION

Figure 2:
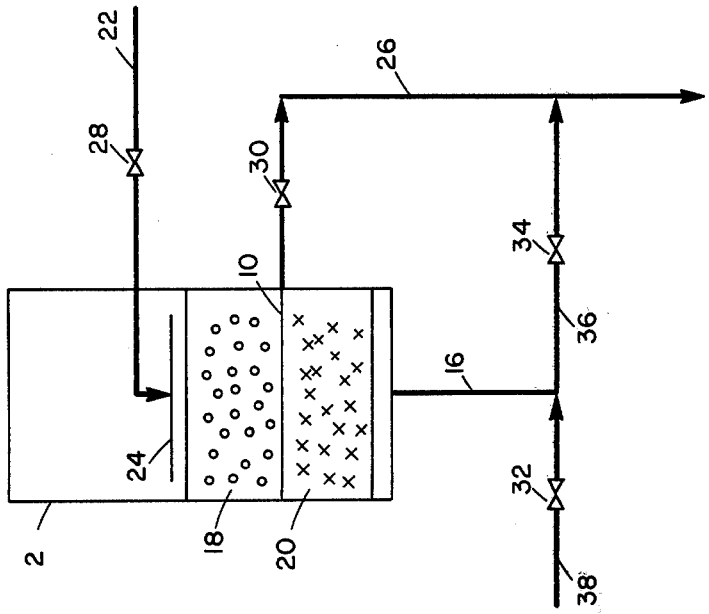
FIG. 2 shows one embodiment of the present ion exchange regeneration process.
Figure 1:
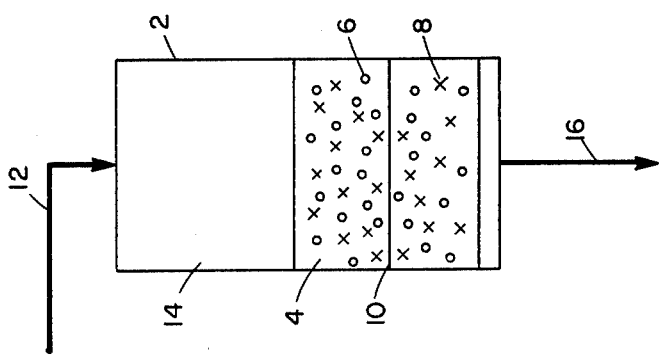
FIG. 1 shows one embodiment of a typical ion exchange process.

Having thus described the invention in general terms, reference is now made to FIGS. 1 and 2. Such details are included as are necessary for a clear understanding of how the present invention may be applied to ion exchange processes, particularly to ion exchange regeneration processes. No intention is made to unduly limit the scope of the present invention to the particular configuration shown as variations obvious to those having ordinary skill in the art of ion exchange processes are included within the broad scope of this invention.

Referring now to FIG. 1, there is shown a mixed bed demineralizer 2 containing a fixed bed 4 comprising an anion exchange resin 6 in a substantially homogeneous mixture with a cation exchange resin 8. An interfacial distribution means 10 is located within fixed bed 4. The particular anion and cation exchange resins employed in the present invention are not critical and can vary broadly. Strong base anion and strong acid cation exchange resins are preferred. It is also preferred that the resins are of a type that are easily purchasable in the marketplace. Normally, the anion exchange resin will be of a lesser specific gravity than the cation exchange resin. Generally, the density of the resins will range from about 40 to about 60 lb/ft$^3$. The particle size of the resins can be varied so that when they are purchased in a mixture or separately, substantially the same particle size for each of the respective anion and cation exchange resins can be obtained. Typically, the particle size will range from about 20 to about 50 Tyler screen mesh.

As shown in FIG. 1, water containing silica and various mineral salts is introduced into demineralizer 2 via line 12 and passed downwardly through the freeboard 14 and through the bed comprising a substantially homogeneous mixture of anion and cation exchange resins such that the salts are removed by direct exchange of the anions and cations forming said salts with the anion and cation portions of the exchange resins. The specific quantities of the anion and cation resins employed in the demineralizer are not critical, and, in general, will depend upon the amount of ions present in the water to be treated. As the salts are removed from the water by ion exchange, at least a portion of the silica present in the water is also removed therefrom. The exact manner in which the silica is removed from water is not known with certainty. Thus, whether the silica is absorbed from the water by the resins, exchanged with the resins, deposited on the resin or the like, is immaterial since the resins, when regenerated according to the present invention, will effectively remove the silica from the water. Thus, water depleted in both silica and mineral salts exits from demineralizer 2 via line 16. If desired, the water may be passed upwardly through demineralizer 2.

Normal operations such as described above will continue until the exchange capacity of the resins becomes exhausted, at which time the resins must be regenerated for further use. However, the particular point at which the resins are considered to be exhausted depends not only on their ability (i.e., capacity) to exchange ions, but also on economic considerations. For example, it may be desirable to regenerate resins whose ion exchange capacity is only mildly reduced to essentially fresh ion exchange capacity rather than allow their capacity to be reduced to a much lower level and then be regenerated to fresh or less than fresh capacity. Therefore, as used herein, the term "regeneration" or "regenerated" means recovering exchange resins that possess greater capacity to effect ion exchange than that possessed by the exhausted exchange resins.

However, prior to the actual regeneration, it is necessary to separate the substantially homogeneous mixture of anion and cation exchange resins into discrete layers. This may be effected by hydraulic grading of the mixed bed by backwashing with a liquid, normally the water to be treated. This can be conveniently understood by reference to FIG. 1 wherein a liquid, say water, would be introduced in the demineralizer 2 via line 16 and passed upwardly through the mixed bed 4, exiting demineralizer 2 via line 12. The upward flowing water causes an expansion and flotation of the mixed bed such that the anion and cation exchange particles will stratify into an anion exchange resin layer 18 and a cation exchange resin layer 20, as is illustrated in FIG. 2. The length of time required to effect segregation of the resins will vary broadly, depending on various factors such as the quantity and size of the particles, water flow rate, water temperature and the like. When hydraulic grading is determined to be complete, the flow of water into demineralizer 2 is ceased and the anion and cation exchange layers allowed to settle, the water being allowed to remain in the tank with the resins. The exchange resins are now ready for regeneration, which will be discussed hereinafter with reference to FIG. 2.

As shown in FIG. 2, an anion regenerant solution is introduced into demineralizer 2 via line 22, through a distribution means 24, and passes downward through only the layer of anion exchange resin 18, exiting the demineralizer via line 26 into, say, a waste reservoir. Valves 28 and 30 are open while valves 32 and 34 are closed during this operation. As the anion regenerant solution is passed through anion exchange resin layer 18, direct exchange of anions between the regenerant solution and the exchange resin will occur. In addition, at least a portion of the silica present on the anion exchange resin will be washed therefrom and passed from the demineralizer by line 26. If desired, the anion regenerant solution may be passed upflow rather than downflow.

The anion regenerant solution should be a dilute alkaline solution, i.e., a solution containing an alkaline reagent in an amount of less than 10 wt. %. Preferably the anion regenerant solution will contain from 1 to about 8 wt. %, more preferably from about 2 to about 4 wt. %, alkaline reagent. The particular alkaline reagent employed may vary broadly and would be well known to one skilled in the art. Typical alakline reagents include soda ash, NH$_3$, NaOH and the like. NaOH is a preferred alkaline reagent.

It is important that only from about 30 to about 80 volume %, preferably from about 60 to about 80 volume %, of the anion regenerant solution is first passed through anion exchange resin layer 18. This is so because we have discovered that silica is also removed from the water by the cation exchange resin. As such, initial passing of the anion regenerant solution through both the anion exchange resin layer 18 and the cation exchange resin layer 20 would serve to merely wash the silica present in layer 18 onto layer 20 so as to further contaminate layer 20 with silica. Similarly, washing only the anion exchange layer with anion regenerant solution would not remove the silica from the cation exchange resin. Thus, the first step in the present regeneration process serves to partially regenerate the anion exchange resin in layer 18 and to wash the silica therefrom such that contamination of cation exchange resin layer 20 with silica from anion exchange resin layer 18 will be minimized during the subsequent washing of both the anion and cation exchange resins with anion regenerant solution. For this reason, at least 30 volume % of the anion regenerant should be passed through anion exchange resin layer 18 initially. Similarly, at least 20 volume % of the anion regenerant solution should be reserved for washing both the anion and cation exchange resins as will be described hereinafter.

The time required to regenerate the anion exchange resin layer 18 will vary broadly depending upon various process and economic considerations such as the size of the layer, the flow rate of anion regenerant solution, the degree of resin exhaustion, the volume of anion regenerant solution employed, and the like. Typically, however, the time required will vary from about 10 to about 240 minutes, preferably from about 30 to about 180 minutes and more preferably from about 90 to about 120 minutes.

After the initial passing of from about 30 to about 80 volume % of the anion regenerant solution through the anion exchange resin layer 18 as described above, the remaining portion of the anion regenerant solution is introduced into demineralizer 2 via line 22 and passed downward through both the anion exchange resin layer 18 and the cation exchange resin layer 20, exiting the demineralizer 2 via line 16 and passing to the waste reservoir via line 36. As shown in FIG. 2, the valves 28 and 34 are open while valves 30 and 32 are closed during this operation. This step serves to wash at least a portion of the silica from the cation exchange resin in layer 20 as well as to further regenerate the anion exchange resin layer 18.

Once the anion exchange resin has been regenerated and the silica has been washed from both the anion and cation exchange resins, the cation exchange resin is then regenerated (as shown in FIG. 2) by passing a cation regenerant solution through line 38 into the lower portion of demineralizer 2 via line 16. The regenerant solution passed upward through the cation exchange resin layer 20 and is discharged from the demineralizer to the waste reservoir via line 26. During this operation, valves 30 and 32 are open while valves 28 and 34 are closed. As the cation regenerant solution passes through the cation exchange resin layer 20, exchange of ions between the regenerant solution and the exchange resin occurs. If desired, the cation regenerant solution may be passed downflow rather than upflow.

The cation regenerant solution should be a dilute acid solution, i.e. a solution containing an acid in an amount of less than 10 wt. %. Preferably, the cation regenerant solution will contain from about 1 to about 10 wt. % acid, more preferably from about 2 to about 6 wt. % acid. The particular acid reagents employed can vary broadly and would be well known to one skilled in the art. Typical acids include sulfuric acid, hydrochloric acid, nitric acid and the like. Sulfuric acid is a preferred acid.

The time required to regenerate the cation exchange resin, as in the case of the anion exchange resin, varies with various process and economic considerations. Typically, from about 10 to about 60 minutes, preferably from about 20 to about 40 minutes, will be required to regenerate the cation exchange resin.

Material balance calculations of the amount of anion or cation regenerant solution required to regenerate each resin can be readily made by one skilled in the art knowing the concentration of acid or caustic in said solution, the degree of regeneration desired and the like. Normally the amount of regenerant solution will be at least that required to replace the ions exchanged from the resin during water treatment. Preferably an excess of regenerant solution over that required will be employed to compensate for losses due to resin efficiency and the like as would be known to one skilled in the art.

The particular temperature and pressure conditions employed during regeneration of each layer are not critical and may vary within the ranges presented in the literature and, thus, are well known to one skilled in the art. Typically the temperature of the water during regeneration of the anion exchange resin will range between about 60° and about 130° F. Water temperatures between about 90° and about 120° F. are normally preferred. Preferably, ambient conditions will be employed during regeneration of the cation exchange resin. Pressures will normally range between about 5 and about 150 psig.

Following regeneration of both the anion and cation exchange layers 18 and 20 as described above, each layer must be rinsed to remove the excess of either type of regenerant solution. To avoid contacting residual anion regenerant solution with the regenerated cation exchange layer (or contacting residual cation regenerant solution with the anion exchange layer), each layer must be washed separately in a manner well known to one skilled in the art. The particular arrangement of valves 28, 30, 32 and 34 to effect the separate rinsing of each layer would be obvious to one skilled in the art. Rinsing is continued until excess regenerant solution is removed from each resin. Normally, this is determined by measuring conductivity of the water, a procedure also well known to one skilled in the art.

When the rinsing is completed, the bed, which is still segregated into two discrete layers, must be mixed so that it can be returned to normal operations. This may be accomplished by introducing air under pressure from some suitable source into the lower portion of demineralizer 2. The air passes upwardly through the segregated anion and cation exchange resin layers, expanding, tumbling and agitating the layers until a thoroughly mixed (i.e., substantially homogeneous) bed like that shown in FIG. 1 is formed. Once the homogeneous mixture of anion and cation exchange resins has been re-established, the flow of air is discontinued and normal operations are resumed.

When normal operations are resumed and water containing silica is contacted with the mixed bed of anion and cation exchange resins that have been regenerated according to the present invention, there results a water effluent that is substantially free of silica. By "substantially free" is meant that the water contains silica in an amount less than 0.1, preferably less than 0.05, more preferably less than 0.02, yet even more preferably less than 0.01, and most preferably less than 0.005 milligrams per liter of silica as $SiO_2$ as measured by ASTM D859 Method B in the 1974 Annual Book of ASTM Standards, Part 31, the disclosures of which are incorporated herein by reference.

The present invention will be further understood by reference to the following example which is not intended to unduly restrict the limits of the claims appended hereto.

EXAMPLE

A test program was conducted to compare the effectiveness of a mixed bed demineralizer containing anion and cation exchange resins in removing silica from water following the regeneration of said resins.

Raw river water containing from about 6 to about 9 wppm silica, from about 85 to about 105 wppm total anions and from about 90 to about 120 wppm total cations was first clarified and then passed through a dual media filter of sand and anthracite to remove suspended solids contained therein. The filtered water (which was filtered to less than 1 Nephelometric Turbidity Unit) was passed through a strong acid cation demineralizer (containing Rohm & Hass Amberlite IR-120) for removal of cations such as sodium, calcium and magnesium ions and then through a weak base anion demineralizer (containing Rohm & Haas Amberlite IRA-94) for removal of anions such as chloride and sulfate ions. Following this treatment, the water contained between about 6 and 9 wppm silica, between 3 and 4 wppm free $CO_2$ and trace amounts of sodium and chloride ion.

The thus-treated water was then passed into a 6-foot long Plexiglass column having an inside diameter of 5.5 inches (hereinafter referred to as the mixed bed demineralizer column) which contained a strong base anion exchange resin (Rohm & Hass Amberlite IRA-402, which has a density of about 43 lb/ft$^3$) in substantially homogeneous mixture with a strong acid cation exchange resin (Rohm & Hass Amberlite IR-120, which has a density ranging between 48–54 lb/ft$^3$). As the water passed downwardly through the mixed bed, the cations and anions forming the salts were exchanged. After ion exchange was completed, the anion and cation exchange resins were separated into a 0.41 ft$^3$ layer of anion exchange resin and a 0.23 ft$^3$ layer of cation exchange resin by backwashing with feed water to the mixed bed demineralizer column. After backwashing, the resins were ready for regeneration according to the two methods described below.

Method 1

Conventional ion exchange regeneration wherein the anion regenerant solution is passed through only the anion exchange resin prior to regenerating the cation exchange resin The mixed bed demineralizer column did not have a means for inserting an interfacial distributor between the anion and cation exchange resins. Therefore, it was necessary to regenerate the anion and cation exchange resins separately. This was accomplished by transferring the cation exchange resin from the mixed bed demineralizer column to a separate 6-foot long Plexiglass column having an inside diameter of 4 inches.

After removal of the cation exchange resin, an anion regenerant solution of 4 wt. % NaOH (equivalent to 6 lbs of NaOH per cubic foot of strong base anion exchange resin) was passed downwardly through 0.41 cubic feet of anion exchange resin (corresponding to a bed depth of about 2.5 feet) at a rate of 0.23 gpm for about 60 minutes at a water temperature of 120° F.

The cation exchange resin was then regenerated in the separate column by passing a cation regenerant solution of 3 wt. % $H_2SO_4$ (equivalent to 5 lbs of $H_2SO_4$ per cubic foot of strong acid cation exchange resin) downwardly through 0.23 cubic feet of the resin (corresponding to a bed depth of about 2.6 feet) at a flow rate of 0.15 gpm for 15 minutes at a water temperature of about 50° F.

After regeneration, the anion exchange resin was rinsed with 80 gallons of feed water per cubic foot of anion resin and the cation exchange resin was rinsed with 75 gallons of said feed water per cubic foot of cation resin. The cation exchange resin was then returned to the mixed bed demineralizer column. Air was passed upwardly through the resin layers until a substantially homogeneous mixture of anion and cation exchange resins was obtained.

Normal water treating operations were resumed and the silica present in the effluent was measured at various intervals using ASTM Test D859 Method B. After one day's operation, the resins were regenerated again as described above. This cycle was repeated for more than two months, the results of which are shown in Table I.

TABLE I

| Day | Service Time hrs | SiO$_2$ mg/l |
|---|---|---|
| 1 (Fresh resins) | 2 | 0.01 |
|  | 4 | 0.01 |
|  | 6 | 0.01 |
| 2 | 2 | 0.02 |
|  | 4 | 0.01 |
|  | 21 | 0.02 |
| 4 | 2 | 0.04 |
|  | 4 | 0.03 |
|  | 15 | 0.02 |
| 8 | 2 | 0.04 |
|  | 3 | 0.04 |
|  | 14.5 | 0.04 |
| 10 | 3 | 0.03 |
|  | 4 | 0.03 |
|  | 16.5 | 0.03 |
| 15 | 1 | 0.04 |
|  | 3 | 0.03 |
|  | 6 | 0.04 |
| 16 | 1 | 0.07 |
|  | 4 | 0.04 |
|  | 5 | 0.03 |
|  | 17 | 0.02 |
| 17 | 2 | 0.05 |
|  | 3 | 0.03 |
|  | 16 | 0.01 |
|  | 24 | 0.01 |
| 22 | 1.5 | 0.15 |
|  | 3 | 0.01 |
|  | 6 | 0.01 |
|  | 8 | 0.01 |
| 23 | 0.5 | 0.06 |
|  | 2.5 | 0.02 |
|  | 4.5 | 0.01 |
|  | 17 | 0.01 |
| 24 | 0.5 | 0.173 |
|  | 1.5 | 0.083 |
|  | 2.5 | 0.054 |
| 25 | 0.5 | 0.128 |
|  | 1.5 | 0.068 |
|  | 2.5 | 0.036 |
|  | 19 | 0.027 |
| 30 | 0.3 | 0.279 |
|  | 1.3 | 0.177 |
|  | 3.3 | 0.084 |
|  | 16 | 0.043 |
| 31 | 0.3 | 0.109 |
|  | 1.3 | 0.064 |
|  | 3.3 | 0.03 |
|  | 17+ | 0.03 |
| 33 | 0.5 | 0.156 |
|  | 1.5 | 0.135 |
|  | 3.5 | 0.081 |
|  | 18+ | 0.039 |
| 37 | 0.5 | 0.135 |
|  | 1.5 | 0.150 |
|  | 3.5 | 0.111 |

TABLE I-continued

| Day | Service Time hrs | SiO$_2$ mg/l |
|---|---|---|
|  | 17+ | 0.018 |
| 38 | 0.3 | 0.098 |
|  | 1.3 | 0.098 |
|  | 2.3 | 0.080 |
|  | 17+ | 0.036 |
| 40 | 0.3 | 0.045 |
|  | 1.3 | 0.024 |
|  | 3.3 | 0.018 |
|  | 16+ | 0.012 |
| 45 | 1.0 | 0.027 |
|  | 2.0 | 0.023 |
|  | 3.0 | 0.021 |
|  | 17+ | 0.048 |
| 47 | 0.5 | 0.096 |
|  | 1.5 | 0.090 |
|  | 2.5 | 0.087 |
|  | 16 | 0.027 |
| 50 | 0.3 | 0.120 |
|  | 1.3 | 0.105 |
|  | 2.3 | 0.099 |
| 51 | 0.3 | 0.120 |
|  | 1.3 | 0.150 |
|  | 2.3 | 0.096 |
| 60 | 0.3 | 0.102 |
|  | 1.3 | 0.120 |
|  | 2.3 | 0.086 |
|  | 16 | 0.038 |
| 64 | 0.5 | 0.036 |
|  | 1.5 | 0.035 |
|  | 2.5 | 0.042 |
|  | 18 | 0.036 |
| 65 | 0.5 | 0.048 |
|  | 1.5 | 0.051 |
|  | 2.5 | 0.045 |
|  | 17 | 0.011 |
| 66 | 0.5 | 0.011 |
|  | 1.5 | 0.011 |
|  | 6.5 | 0.015 |
|  | 18 | 0.041 |
| 67 | 0.3 | 0.131 |
|  | 1.3 | 0.140 |
|  | 2.3 | 0.123 |
|  | 14 | 0.08 |
| 68 | 0.3 | 0.05 |
|  | 1.3 | 0.03 |
|  | 2.3 | 0.024 |
| 69 | 0.3 | 0.162 |
|  | 1.3 | 0.142 |
|  | 2.3 | 0.123 |
| 70 | 0.2 | 0.027 |
|  | 1.2 | 0.024 |
|  | 2.2 | 0.020 |
|  | 19 | 0.044 |
| 76 | 0.3 | 0.12 |
|  | 1.3 | 0.11 |
|  | 2.3 | 0.10 |

Method 2

Modified ion exchange regeneration procedure of the present invention wherein from 30 to 80 volume % of the anion regenerant solution is passed through the anion exchange resin, the remaining anion regenerant solution being passed through both the anion and cation exchange resins prior to regenerating the cation exchange resin Following segregation of the anion and cation exchange resins by backwashing as described above, the cation exchange resin was transferred to the separate column and an anion regenerant solution of 3 wt. % solution of NaOH (equivalent to 6 lbs of NaOH per cubic foot of strong base anion exchange resin) was passed downwardly through the anion exchange resin at a rate of 0.23 gpm for 45 minutes at a water temperature of 120° F. This corresponded to about 75 volume % of the anion regenerant solution. The anion solution was then rinsed with mixed bed demineralizer feed water at a flow rate of 0.23 gpm for 30 minutes.

The cation exchange resin was returned to the mixed bed demineralizer column and the remaining 25 volume % of the anion regenerant solution was passsed downwardly through both the anion and cation exchange resins at a rate of 0.23 gpm for 15 minutes at a water temperature of 120° F. The anion and cation exchange resins were then rinsed with mixed bed demineralizer feed water at a flow rate of 0.23 gpm for 45 minutes. The cation exchange resin was transferred to the separate Plexiglass column, and the anion exchange resin was rinsed with said feed water at a flow rate of 1 gallon per minute for 40 minutes.

A cation regenerant solution of 3 wt. % H$_2$SO$_4$ (equivalent to 5 lbs of H$_2$SO$_4$ per cubic foot of strong acid cation exchange resin) was passed downwardly through the cation exchange resin at a rate of 0.15 gpm for 30 minutes at ambient water temperature. The cation exchange resin was rinsed with mixed bed demineralizer feed water at a flow rate of 0.15 gpm for 20 minutes and then with said water at a flow rate of 0.5 gpm for 30 minutes. The cation exchange resin was then returned to the mixed bed demineralizer column. The separate resin layers were air mixed to form the substantially homogeneous mixture of anion and cation exchange resins such that the system was ready for normal operations.

Normal operations were again resumed and the concentration of silica present in the treated water was monitored as described in Method 1. This cycle was repeated for more than one month, the results of which are shown in Table II.

TABLE II

| Day | Service Time hrs | SiO$_2$ mg/l |
|---|---|---|
| 84 | 0.5 | 0.065 |
|  | 2.0 | 0.018 |
|  | 3.5 | 0.012 |
|  | 4.5 | 0.009 |
| 85 | 0.5 | 0.041 |
|  | 1.5 | 0.020 |
|  | 2.5 | 0.018 |
|  | 3.5 | 0.014 |
| 112 | 0.5 | 0.006 |
|  | 1.5 | 0.007 |
|  | 2.5 | 0.010 |
|  | 3.5 | 0.006 |
| 113 | 0.3 | 0.005 |
|  | 1.3 | 0.006 |
|  | 2.3 | 0.008 |
|  | 17.3 | 0.003 |
| 114 | 0.05 | 0.012 |
|  | 1.5 | 0.007 |
|  | 2.5 | 0.019 |
|  | 3.5 | 0.006 |
| 115 | 0.1 | 0.01 |
|  | 1.1 | 0.008 |
|  | 2.1 | 0.008 |
| 119 | 0.3 | 0.002 |
|  | 1.3 | 0.002 |
|  | 2.3 | 0.000 |
|  | 3.3 | 0.002 |
| 120 | 0.2 | 0.001 |
|  | 1.2 | 0.001 |
|  | 2.2 | 0.001 |
|  | 17.2 | 0.001 |
| 121 | 0.2 | 0.007 |
|  | 1.2 | 0.004 |
|  | 2.2 | 0.002 |
|  | 3.2 | 0.004 |
| 122 | 0.3 | 0.001 |
|  | 1.3 | 0.001 |

TABLE II-continued

| Day | Service Time hrs | SiO₂ mg/l |
|---|---|---|
| | 2.3 | 0.001 |
| 126 | 0.1 | 0.007 |
| | 1.0 | 0.006 |
| | 2.0 | 0.004 |
| | 3.0 | 0.002 |
| 127 | 0.5 | 0.002 |
| | 1.5 | 0.002 |
| | 2.5 | 0.002 |
| | 21.5 | 0.006 |
| 128 | 0.5 | 0.017 |
| | 1.5 | 0.014 |
| | 2.5 | 0.011 |
| | 3.5 | 0.012 |

Most of the data in Table II show that the amount of silica in the treated water can be reduced to below 0.01 milligram per liter with little difficulty. In contrast, Table I shows that such low levels cannot be obtained using conventional regeneration techniques with any degree of consistency.

What is claimed is:

1. A process for regenerating the anion exchange resin and the cation exchange resin comprising a mixed bed demineralizer wherein the ion exchange capacity of said resins has been reduced during contact with water containing mineral salts and silica, which comprises:
   (a) separating said resins into a layer of anion exchange resin and a layer of cation exchange resin by backwashing;
   (b) passing through said layer of anion exchange resin from about 30 to about 80 volume % of at least the amount of an anion regenerant solution required to replace the ions exchanged from the resin during contact with said water, thereby partially regenerating the anion exchange resin and removing at least a portion of the silica from said resin;
   (c) passing the remaining portion of said anion regenerant solution through the layer of anion exchange resin and the layer of cation exchange resin, thereby further regenerating the anion exchange resin and removing at least a portion of the silica from the cation exchange resin;
   (d) passing a cation regenerant solution through the cation exchange resin of (c) so as to regenerate said cation exchange resin.

2. The process of claim 1 wherein the anion exchange resin is a strong base anion exchange resin and the cation exchange resin is a strong acid cation exchange resin.

3. The process of claim 1 wherein from about 60 to about 80 volume % of said amount of required anion regenerant solution is employed in (b).

4. The process of claim 1 wherein said anion regenerant solution comprises an alkaline solution containing alkaline in an amount less than 10 wt. %.

5. The process of claim 4 wherein said anion regenerant solution is NaOH.

6. The process of claim 1 wherein said anion regenerant solution comprises from about 2 to about 4 wt. % NaOH.

7. The process of claim 1 wherein said cation regenerant solution comprises an acid solution containing an acid in an amount less than 10 wt. %.

8. The process of claim 7 wherein the acid contained in said cation regenerant solution is selected from the group consisting of $H_2SO_4$, HCl, $HNO_3$ and mixtures thereof.

9. The process of claim 1 wherein said cation regenerant solution comprises from about 2 to about 6 wt. % $H_2SO_4$.

10. A process for removing mineral salts and silica from water which comprises:
    (a) contacting said water in a mixed bed demineralizer with a substantially homogeneous mixture of an anion exchange resin and a cation exchange resin for a period of time sufficient to reduce the ion exchange capacity of said resins;
    (b) regenerating said resins according to the process of claim 1;
    (c) withdrawing water from said demineralizer containing silica in an amount less than 0.1 milligrams per liter.

11. The process of claim 10 wherein the water withdrawn from said demineralizer contains silica in an amount of less than 0.01 milligrams per liter.

12. The process of claim 10 wherein the water withdrawn from said demineralizer contains silica in an amount of less than 0.005 milligrams per liter.

* * * * *